| United States Patent [19] | [11] | 4,346,063 |
|---|---|---|
| Cahn et al. | [45] | Aug. 24, 1982 |

[54] DESULFURIZATION OF HOT GAS WITH CERIUM OXIDE

[75] Inventors: Robert P. Cahn, Millburn; John M. Longo, New Providence, both of N.J.

[73] Assignee: Exxon Research & Engineering Co., Florham Park, N.J.

[21] Appl. No.: 243,720

[22] Filed: Mar. 16, 1981

[51] Int. Cl.³ .............................................. B01D 53/34
[52] U.S. Cl. ................................... 423/230; 423/244; 423/263; 423/539
[58] Field of Search .................. 423/230, 219, 244 R, 423/539, 544, 563, 263; 252/462

[56] References Cited

U.S. PATENT DOCUMENTS

| 3,974,256 | 8/1976 | Wheelock et al. | 423/230 |
| 4,001,375 | 1/1977 | Longo | 423/244 R |
| 4,002,720 | 1/1977 | Wheelock et al. | 423/230 |
| 4,251,496 | 2/1981 | Longo et al. | 423/244 R X |

Primary Examiner—Earl C. Thomas
Attorney, Agent, or Firm—Edward M. Corcoran

[57] ABSTRACT

A gas containing oxygen, $H_2S$ and sulfur oxides is desulfurized by contacting same with cerium oxide at a temperature of from about 350°–600° C. This invention is particularly useful for desulfurizing tail gas from a Claus plant. In a preferred embodiment the cerium oxide is supported on alumina and oxygen is present in the gas in an amount more than that stoichiometrically required to convert the $H_2S$ and $SO_2$ to cerium oxysulfate.

19 Claims, No Drawings

DESULFURIZATION OF HOT GAS WITH CERIUM OXIDE

FIELD OF THE INVENTION

This invention relates to catalytically converting $H_2S$ to sulfur oxides in the presence of a cerium oxide catalyst. More particularly, this invention relates to removing $H_2S$ from a gas containing same and oxygen by contacting said gas with cerium oxide at elevated temperature. Still more particularly, this invention relates to simultaneously removing $H_2S$ and sulfur oxides from a Claus plant tail gas by contacting said gas and oxygen with cerium oxide at a temperature of from between about 350°–600° C. to produce a desulfurized gas and cerium oxysulfate.

BACKGROUND OF THE DISCLOSURE

Tail gas from Claus plants usually contains both $H_2S$ and $SO_2$ due to the incomplete conversion of the $H_2S$ feed in the Claus plant to elemental sulfur. Cleanup of the tail gas means the removal of both $H_2S$ and $SO_2$ and conventional processes either reduce the $SO_2$ in the gas to $H_2S$ over a cobalt molybdate catalyst in the presence of hydrogen followed by cooling and removing the $H_2S$ from the cool gas by conventional acid gas scrubbing techniques or by oxidizing the $H_2S$ to $SO_2$ followed by cooling and conventional techniques for removing $SO_2$ such as lime scrubbing. Converting $H_2S$ to $SO_2$ requires adding air and preheating the gas to at least 600°–650° C. to insure complete oxidation of the $H_2S$ to $SO_2$. U.S. Pat. No. 4,001,375 discloses that cerium oxide can be used to remove sulfur oxides from an oxygen containing flue gas. It would constitute an improvement to the art if one could also use cerium oxide to remove $H_2S$ and, preferably, if one could simultaneously remove both $H_2S$ and sulfur oxides. In the case of removing such gases from a Claus plant tail gas, such a process would eliminate the need for separate high temperature combustion of $H_2S$ or for reducing sulfur oxides to $H_2S$, the latter requiring considerable quantities of hydrogen.

SUMMARY OF THE INVENTION

It has now been found that cerium oxide will catalytically convert $H_2S$ to sulfur oxides in the presence of oxygen and at elevated temperature and absorb the so-formed sulfur oxides to form cerium oxysulfate. Thus, the instant invention relates to a process for desulfurizing a gas containing $H_2S$ or a mixture of $H_2S$ and sulfur oxides by contacting said gas, at elevated temperature and in the presence of oxygen with cerium oxide. More particularly, the present invention is a process for removing $H_2S$ from a gas stream comprising $H_2S$ and oxygen by contacting said gas with cerium oxide at a temperature of from about 350°–600° C. to produce a gas of reduced $H_2S$ content. A particularly preferred embodiment of this invention is a process for simultaneously removing both $H_2S$ and sulfur oxides from a Claus plant tail gas comprising same and oxygen by contacting said gas with cerium oxide at said elevated temperatures wherein the cerium oxide is supported on alumina and the oxygen is present in an amount in excess of that stoichiometrically required to convert the $H_2S$ and sulfur oxides to cerium oxysulfate.

DETAILED DESCRIPTION

The minimum contacting temperature for the process of this invention is somewhat critical inasmuch as it has been found that at a temperature below about 350° C., cerium oxide will not oxidize the $H_2S$ and, consequently, will not remove same from the gas stream. Preferred temperatures range between about 350° C.–600° C. and, particularly preferred are temperatures of from about 400°–550° C. The pressure is not critical and, for convenience, whatever pressure is obtained at the flow rate and temperatures utilized in the processes of this invention will be acceptable. The amount of oxygen in the $H_2S$-containing gas stream must be enough to convert said $H_2S$ to cerium oxysulfate in the presence of the cerium oxide. Preferably, the oxygen should be present in an amount at least equal to that which is stoichiometrically required to convert all of the $H_2S$ and $SO_2$ present in the gas to cerium oxysulfate. In a particularly preferred embodiment of the process of this invention, the gas stream will comprise the tail gas from a Claus plant containing $H_2S$ and sulfur oxides along with some $H_2O$, $CO_2$ and $N_2$ and said gas stream will be mixed with oxygen or an oxygen-containing gas such as air in an amount sufficient to insure a 10–500% stoichiometric excess of the oxygen required to convert all of the $H_2S$ and $SO_2$ in the gas stream to cerium oxysulfate according to the following reactions and to insure that the gas stream is net oxidizing ($SO_3$ reacts with $CeO_2$ directly without the need for oxygen).

$$2CeO_2 + 3H_2S + 6O_2 \rightarrow 3H_2O + Ce_2O(SO_4)_3$$

$$2CeO_2 + 3SO_2 + 3/2 O_2 \rightarrow Ce_2O(SO_4)_3$$

$$2CeO_2 + 3SO_3 \rightarrow Ce_2O(SO_4)_3$$

Additionally, the gas may contain $CO_2$, $CO$, $H_2O$, $NO$, $NO_2$, etc. None of these additional components will interfere with the process of this invention. Thus, the oxygen and $H_2S$-containing gas may contain any component which will not interfere with the process of this invention.

The cerium oxide may be in either the +3 or +4 oxidation state and, preferably in the +4 oxidation state as $CeO_2$. If it is in the +3 state, sufficient excess oxygen must be present in the gas stream to convert the cerium to the +4 oxidation state during the sulfur sorption. Although the cerium oxide may be employed in bulk in the process of this invention, it is preferably supported on an inert support in order to obtain more contact surface per unit of weight of cerium oxide and, additionally, in order to minimize the decrepitation and crumbling caused by volume change when the cerium oxide absorbs the sulfur oxides and is converted to cerium oxysulfate and, conversely, when the cerium oxysulfate is regenerated and converted back to cerium oxide. Suitable supports include inorganic oxides such as alumina, amorphous silica-alumina, crystalline aluminosilicates, titania, zirconia, boria, thoria, kieselguhr and mixtures thereof. A preferred support is alumina and particularly gamma-alumina. The amount of cerium oxide present on the support will generally range from about 1 to about 40 wt. % of said support, preferably from about 2 to 30 wt. % and still more preferably from about 15 to 25 wt. % of the support. The supported cerium oxide used in the processes of this invention may be prepared by any methods well-known in the art including, for example, impregnating with an aqueous solution of a cerium oxide precursor such as cerium ammonia nitrate, cerium nitrate, basic cerium nitrate, cerium acetate, etc. Alternatively, the incipient wetness technique can be employed. In any event, the exact procedure for preparing the supported cerium oxide is not critical to the process of this invention and those skilled in the art will utilize whatever method is convenient.

As hereinbefore described, the essence of the present invention resides in the discovery that cerium oxide acts as a catalyst to convert oxygen and H$_2$S to water and sulfur oxides with the so-formed sulfur oxides then being absorbed by the cerium oxide in the presence of oxygen in an amount sufficient to form cerium oxysulfate, it being well known in the art that cerium oxide is a sulfur trioxide sorbent and that the product thereof is cerium oxysulfate. The spent cerium oxide sorbent can then be regenerated with a suitable reducing gas such as H$_2$, CO, CH$_4$, etc. copending U.S. Patent Ser. No. 322,175 discloses a process for regenerating spent SO$_2$ sorbents, including cerium oxide, by contacting same with a reducing gas comprising H$_2$S which converts the spent cerium sorbent or cerium oxysulfate to cerium oxide along with the production of sulfur dioxide and water.

A particularly preferred embodiment of the process of this invention is the simultaneous removal of both H$_2$S and SO$_2$ from a Claus plant tail gas. In the Claus plant an H$_2$S-rich gas stream is converted to elemental sulfur by initially burning one third of the H$_2$S to SO$_2$ and then reacting the resultant 2/1 H$_2$S/SO$_2$ mixture over a catalyst to form sulfur and water by the Claus reaction:

$$2H_2S + SO_2 \rightarrow 3S + 2H_2O.$$

Depending on the final contacting temperature, the Claus reaction will approach completion to a varying degree. This leaves behind some unreacted H$_2$S and SO$_2$ in the Claus plant tail gas, which therefore requires cleanup and the present invention represents an advantageous means of carrying out this simultaneous removal of both H$_2$S and sulfur oxides. It could be particularly advantageous to regenerate the spend cerium oxysulfate of the process of this invention by utilizing an H$_2$S-rich gas such as a Claus plant feed gas and then feed the spent regeneration gas comprising SO$_2$ and H$_2$O, as well as unreacted H$_2$S back to the Claus plant wherein the H$_2$S and SO$_2$ will be converted to elemental sulfur.

The invention will be more fully understood by reference to the following examples.

EXAMPLE

In this experiment, cerium dioxide was supported on alumina extrudates ⅛ by ¼ long (the catalyst being prepared by impregnating the alumina with a solution of ceric ammonium nitrate to give a composite of 20 wt. % cerium oxide on the alumina). The ratio of this solution to the alumina was adjusted so that the solution just wetted the support and was completely absorbed thereby. The composite was then dried at 100° C. and calcined at temperatures up to 600° C. overnight in air, with the final composite comprising 20 wt. % cerium dioxide on alumina. The catalyst was then used in a flow reactor wherein 15 cc of the catalyst was contacted with a gas mixture containing 0.5 volume % H$_2$S and 2% O$_2$ (100% excess O$_2$), with the remainder being a mixture of nitrogen and argon. This gas was passed over the catalyst at a space velocity of approximately 2000 V/V/Hr. At temperatures below 350° C. the H$_2$S was not oxidized and was detected in the exit gas by bubbling it through a lead nitrate solution. At temperatures between 350° C. and 600° C., no H$_2$S was observed in the gas exiting the catalyst bed. Analysis of the cerium oxide/alumina composite by x-ray diffraction after these runs at different temperatures revealed that the cerium oxide had been converted to cerium oxysulfate. Above 600° C., the H$_2$S is converted to sulfur oxides, but the cerium oxysulfate becomes unstable.

Thus, at temperatures between about 350°-600° C. the cerium oxide converted the hydrogen sulfide and oxygen to sulfur oxides which, in the presence of oxygen, when then absorbed in-situ by the cerium oxide to form cerium oxysulfate, thereby removing the H$_2$S from the gas mixture and demonstrating the process of this invention.

What is claimed is:

1. A process for removing H$_2$S from a gas stream comprising H$_2$S and oxygen wherein said oxygen is present in said gas in an amount at least equal to that stoichiometrically required to convert the H$_2$S to cerium oxysulfate, said process comprising contacting said gas stream with cerium oxide at a temperature of at least about 350° C. to produce a gas of reduced H$_2$S content.

2. The process of claim 1 wherein said contacting is carried out at a temperature of from between about 350°-600° C.

3. The process of claim 2 wherein said gas stream is net oxidizing.

4. The process of claim 3 wherein said cerium oxide is supported on an inert, inorganic refractory oxide.

5. The process of claim 4 wherein said cerium oxide on the support comprises from about 1-40 wt. % of said support.

6. The process of claims 3, 4, or 5 wherein said oxygen is present in an amount in excess of that required to convert said H$_2$S to cerium oxysulfate.

7. The process of claim 6 wherein said support comprises alumina.

8. The process of claim 7 wherein substantially all of said H$_2$S is converted to cerium oxysulfate.

9. The process of claim 8 wherein the oxygen is present in said gas stream in an amount at least 10% in excess of that required to convert said H$_2$S to cerium oxysulfate.

10. A process for simultaneously removing both H$_2$S and sulfur oxides from a gas feed stream containing same comprising contacting a mixture of said feed gas and oxygen with cerium oxide at a temperature of at least about 350° C. to produce a gas of reduced H$_2$S and sulfur oxide content, wherein said oxygen is present in said gas mixture in an amount at least equal to that amount of oxygen required to stoichiometrically convert all of the H$_2$S and SO$_2$ in said feed gas to cerium oxysulfate.

11. The process of claim 10 wherein said gas mixture is net oxidizing.

12. The process of claim 11 wherein said contacting is carried out at a temperature of from between about 350°-600° C.

13. The process of claim 12 wherein said cerium oxide is supported on an inorganic refractory oxide support.

14. The process of claims 10 or 13 wherein said gas feed stream comprises a tail gas from a Claus plant.

15. The process of claim 14 wherein the oxygen is derived from air added to the tail gas of a Claus plant.

16. The process of claim 14 wherein said so-formed cerium oxysulfate is contacted with an $H_2$-containing regenerating gas at elevated temperatures to form cerium oxide and a spent regenerating gas rich in $SO_2$.

17. The process of claim 16 wherein said spent regenerating gas is fed to said Claus plant.

18. The process of claim 16 wherein said regenerating gas comprises at least a portion of a Claus plant feed gas.

19. The process of claim 10 wherein said so-formed cerium oxysulfate is contacted with an $H_2S$-containing regenerating gas at elevated temperatures to form cerium oxide and a spent regenerating gas rich in $SO_2$.

* * * * *